(12) United States Patent
Phillips et al.

(10) Patent No.: US 9,705,258 B2
(45) Date of Patent: Jul. 11, 2017

(54) FEED-THROUGH ADAPTER ASSEMBLY FOR AN ELECTRICAL CONNECTOR SYSTEM

(71) Applicant: TYCO ELECTRONICS CORPORATION, Berwyn, PA (US)

(72) Inventors: Michael John Phillips, Camp Hill, PA (US); Randall Robert Henry, Harrisburg, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 155 days.

(21) Appl. No.: 14/819,828

(22) Filed: Aug. 6, 2015

(65) Prior Publication Data
US 2017/0040745 A1  Feb. 9, 2017

(51) Int. Cl.
*H01R 13/659* (2011.01)
*H01R 13/6581* (2011.01)
*H01R 12/71* (2011.01)

(52) U.S. Cl.
CPC .......... *H01R 13/659* (2013.01); *H01R 12/71* (2013.01); *H01R 13/6581* (2013.01)

(58) Field of Classification Search
CPC .................................................. H01R 13/659
See application file for complete search history.

(56) References Cited

U.S. PATENT DOCUMENTS

| | | | |
|---|---|---|---|
| 5,299,942 A * | 4/1994 | Burke | H01R 13/6485 439/79 |
| 5,518,418 A * | 5/1996 | Larabell | G11B 33/122 439/218 |
| 5,784,644 A * | 7/1998 | Larabell | G06F 13/409 710/14 |
| 6,040,760 A * | 3/2000 | Kataoka | B60R 11/02 307/10.2 |
| 6,098,127 A | 8/2000 | Kwang | |
| 6,219,252 B1 * | 4/2001 | Tsai | G06F 1/1632 174/359 |
| 6,699,074 B1 * | 3/2004 | Wu | H01R 13/659 439/607.08 |
| 6,722,915 B1 | 4/2004 | McAlonis et al. | |
| 6,722,924 B1 * | 4/2004 | Zhou | H01R 13/659 439/607.23 |
| 6,948,977 B1 * | 9/2005 | Behrent | H01R 23/688 439/581 |
| 7,566,244 B1 * | 7/2009 | Nguyen | G02B 6/4201 439/352 |
| 8,057,263 B1 | 11/2011 | Howard et al. | |

(Continued)

*Primary Examiner* — James Harvey

(57) ABSTRACT

A feed-through adapter assembly includes a bezel cage configured to receive a pluggable module. Walls of the cage are manufactured from a metal material and provide electrical shielding for the pluggable module. A feed-through connector is received in the bezel cage and is positioned at or near a rear end of the cage member. The feed-through connector has a feed-through connector housing holding a contact assembly. The contact assembly has a plurality of feed-through contacts defining a first board mating interface configured to mate with and be electrically connected to a circuit board of the pluggable module and a second board mating interface configured to mate with and be electrically connected to a circuit board of a cable connector. The first and second board mating interfaces are substantially identical.

20 Claims, 4 Drawing Sheets

(56) References Cited

U.S. PATENT DOCUMENTS

| | | | |
|---|---|---|---|
| 8,435,074 B1* | 5/2013 | Grant | H01R 13/6587 439/607.23 |
| 2009/0029593 A1* | 1/2009 | Chuang | H01R 13/659 439/607.41 |
| 2010/0151739 A1* | 6/2010 | Foratier | H01R 31/06 439/638 |
| 2017/0040745 A1* | 2/2017 | Phillips | H01R 12/71 |

\* cited by examiner

FEED-THROUGH ADAPTER ASSEMBLY FOR AN ELECTRICAL CONNECTOR SYSTEM

BACKGROUND OF THE INVENTION

The subject matter herein relates generally to a feed-through adapter assembly for an electrical connector system.

Connector systems, such as those used in data communication systems, typically include an electrical connector assembly having a metal cage with one or more ports that each receive a pluggable module therein, such as a small form factor pluggable module (SFP module), a quad small form factor pluggable module (QSFP module), or another type of I/O transceiver module that is used for interfacing networking hardware. The pluggable module may plug into a communication connector that is held within the cage and is electrically connected to a host circuit board. The pluggable module is electrically connected to an electrical component on the host circuit board through circuit traces routed between the communication connector and the electrical component on the host circuit board. A front end of the cage that includes the port or ports for the pluggable module is typically held within a panel of a housing and/or a bezel covers the front end of the cage.

The pluggable modules transmit data and power on signal lines and power lines thereof to the communication connector. The data and power is transmitted from the communication connector to the host circuit board. The data is transmitted along the host circuit board to the electrical component. The electrical component may be powered by the power transmitted to the host circuit board through the communication connector. Shielding of the signal lines, particularly the high speed signal lines, is difficult. The power lines interfere and degrade the signals on the signal lines. Additionally, routing the signals through the circuits on the host circuit board may degrade the signals between the communication connector and the electrical component.

There is a need for an electrical connector system having improved shielding and or enhanced signal transmission between a pluggable module and an electrical component within the network system.

BRIEF DESCRIPTION OF THE INVENTION

In an embodiment, a feed-through adapter assembly is provided including a bezel cage having a plurality of walls defining a port configured to receive a pluggable module therein through a front end of the cage member. The walls are manufactured from a metal material and provide electrical shielding for the port and the pluggable module. The bezel cage is configured to be mounted to a bezel at an opening in the bezel. A feed-through connector is received in the bezel cage and is positioned at or near a rear end of the cage member. The feed-through connector has a feed-through connector housing holding a contact assembly. The contact assembly has a plurality of feed-through contacts defining a first board mating interface configured to mate with and be electrically connected to a circuit board of the pluggable module and a second board mating interface configured to mate with and be electrically connected to a circuit board of a cable connector. The first and second board mating interfaces are substantially identical.

In another embodiment, an electrical connector system is provided including a feed-through adapter assembly having a bezel cage and a feed-through connector received in the bezel cage. The bezel cage is configured to be mounted to a bezel at an opening in the bezel. The bezel cage has a plurality of walls providing electrical shielding for the feed-through connector and a pluggable module received in the bezel cage being electrically connected to the feed-through connector. The feed-through connector has a plurality of signal lines and a plurality of power lines electrically connected to the pluggable module. The electrical connector system includes a split cable assembly electrically connected to the feed-through adapter assembly. The split cable assembly has a first cable and a second cable. The split cable assembly has a joint connector, a first split connector and a second split connector. The first cable extends between the joint connector and the first split connector and the second cable extends between the joint connector and the second split connector. The joint connector is mated with and electrically connected to the feed-through connector. The first split connector is configured to be mated with a first electrical component mounted to a host circuit board. The second split connector is configured to be mated with a second electrical component being mounted to the host circuit board separate from the first electrical component. The split cable assembly separates signal lines and power lines such that signal lines of the split cable assembly are routed along the first cable to the first split connector and power lines of the split cable assembly are routed along the second cable to the second split connector.

In a further embodiment, an electrical connector system is provided including a feed-through adapter assembly having a bezel cage and a feed-through connector received in the bezel cage. The bezel cage is configured to be mounted to a bezel at an opening in the bezel. The bezel cage has a plurality of walls defining a port configured to receive a pluggable module therein through a front end of the cage member at the bezel. The feed-through connector is positioned at a rear end of the cage member for electrical connection with the pluggable module. The walls are manufactured from a metal material and provide electrical shielding for the feed-through connector and the pluggable module. The feed-through connector has a feed-through connector housing holding a contact assembly having a plurality of feed-through contacts. The feed-through contacts define a first board mating interface configured to mate with and be electrically connected to a circuit board of the pluggable module and a second board mating interface. The feed-through contacts define a plurality of signal lines and a plurality of power lines through the feed-through connector. The electrical connector system includes a split cable assembly electrically connected to the feed-through adapter assembly. The split cable assembly has first and second cables as well as a joint connector, a first split connector and a second split connector. The first cable extends between the joint connector and the first split connector. The second cable extends between the joint connector and the second split connector. The joint connector is mated with and electrically connected to the feed-through adapter assembly at the second board mating interface. The split cable assembly separates signal and power lines such that signal lines of the split cable assembly are routed along the first cable to the first split connector and power lines of the split cable assembly are routed along the second cable to the second split connector.

DETAILED DESCRIPTION OF THE INVENTION

Figure 1:
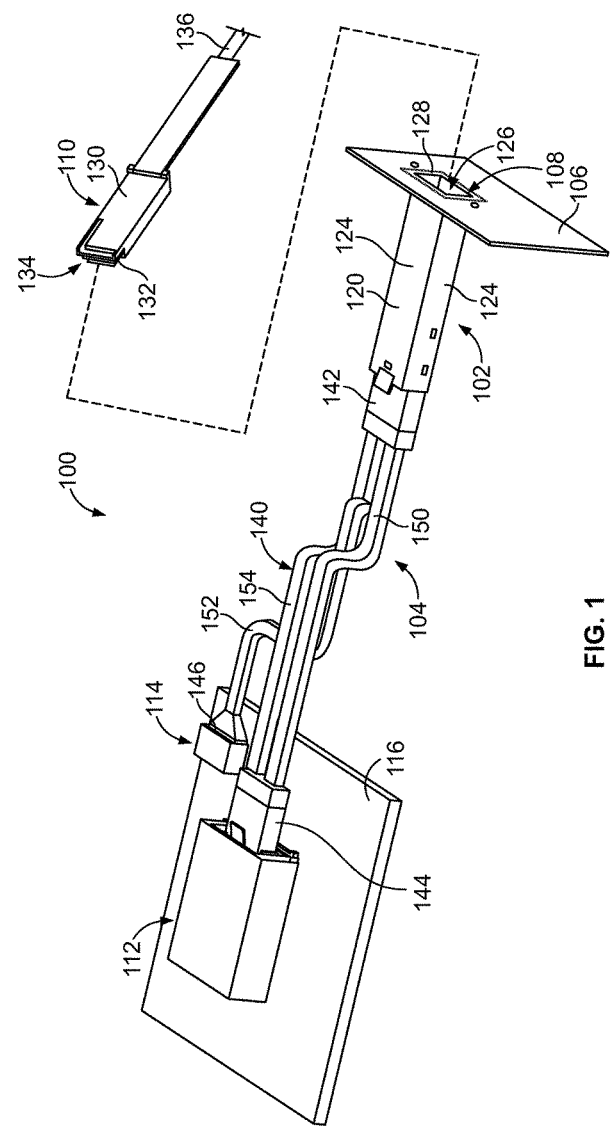
FIG. 1 illustrates an electrical connector system formed in accordance with an exemplary embodiment.

FIG. 1 illustrates an electrical connector system 100 formed in accordance with an exemplary embodiment. The electrical connector system 100 may be part of or used with telecommunication systems or devices. For example, the electrical connector system 100 may be part of a switch, router, server, hub, network interface card, or storage system. In an exemplary embodiment, the electrical connector system is configured to transmit data signals and power between various electrical components.

The electrical connector system 100 includes a feed-through adaptor assembly 102 and a split cable assembly 104 electrically connected to the feed-through adaptor assembly 102. The feed-through adaptor assembly 102 is coupled to a panel or bezel 106 of a housing or device. The feed-through adaptor assembly 102 is coupled to the bezel 106 at a bezel opening 108 that allows a pluggable module 110 to be loaded therethrough for electrical connection to the feed-through adaptor assembly 102. In the illustrated embodiment, the electrical connector system 100 includes a single feed-through adaptor assembly 102 for interfacing with a single pluggable module 110; however, the electrical connector system 100 may include any number of feed-through adaptor assemblies 102 for interfacing with a corresponding number of pluggable modules 110. For example, the feed-through adaptor assemblies 102 may be arranged as an array in one or more rows for interfacing with multiple pluggable modules 110.

The split cable assembly 104 electrically connects the feed-through adaptor assembly 102 with corresponding electrical components 112, 114 mounted to a host circuit board 116. The feed-through adaptor assembly 102 is located remote from the host circuit board 116 and the split cable assembly 104 spans between the feed-through adaptor assembly 102 and the electrical components 112, 114. In an exemplary embodiment, the split cable assembly 104 includes a split cable for routing to multiple different electrical components 112, 114 (the split cable assembly 104 may be routed to more than two electrical components in alternative embodiments). For example, in an exemplary embodiment, the split cable assembly 104 routes high speed data signals to the first electrical component 112 and routes power to the second electrical component 114.

The first and second electrical components 112, 114 may be mounted to different mounting locations on the host circuit board 116 or may be mounted to different circuit boards altogether. Optionally, the host circuit board 116 may include one or more power circuits to direct the power from the second electrical component 114 to other electrical components on the host circuit board 116, such as the first electrical components 112. As such, while the high speed data signals are transmitted directly to the first electrical component 112 (bypassing circuits in the host circuit board 116), the power for the first electrical component 112 is supplied via the host circuit board 116. The high speed data signals may be isolated from the power such that the power does not degrade the data signals. Optionally, the split cable assembly 104 may include other transmission lines, such as low speed data signal lines, control lines, or other types of transmission lines. Such transmissions may be made with the high speed data signals or with the power. For example, the control line may be routed with the power to the second electrical component 114.

The feed-through adaptor assembly 102 includes a bezel cage 120 and a feed-through connector 122 (shown in FIGS. 3 and 4) received in the bezel cage 120. The bezel cage 120 is configured to be mounted to the bezel 106 at or near the bezel opening 108 (for example, mounted directly to the bezel 106 or mounted to a structure associated with the bezel 106). The bezel cage 120 includes a plurality of walls 124 providing electrical shielding for the feed-through connector 122 and the pluggable module 110 received in the bezel cage 120. The walls 124 define a port 126 open at a front end 128 of the bezel cage 120 that receives the pluggable module 110. The pluggable module 110 is loaded into the port 126 until the pluggable module 110 is electrically connected to the feed-through connector 122.

The pluggable module 110 may be any type of pluggable module configured to convey data signals and power. The pluggable module 110 may be an I/O transceiver. The pluggable module 110 may be a small form factor pluggable module (SFP module), a quad small form factor pluggable module (QSFP module) or other type of telecommunication or data communication transceiver. In an exemplary embodiment, the pluggable module 110 includes a housing or shell 130 holding a circuit board 132 of the pluggable module 110. The circuit board 132 is provided at a mating end 134 of the pluggable module 110. A cable 136 extends from the opposite end of the pluggable module 110. The shell 130 and circuit board 132 define a mating interface at the mating end 134. The mating interface may be defined by an arrangement of pads or circuits at the edge of the circuit board 132 corresponding to signal, power, control, ground or other circuits of the circuit board 132 in accordance with a circuit scheme. The mating end 134 is plugged into the port 126 of the bezel cage 120 at the front end 128.

The split cable assembly 104 includes a plurality of cables 140 extending between cable connectors 142, 144, 146. In an exemplary embodiment, the cable connectors include a joint connector 142 and a plurality of split connectors. In the illustrated embodiment, the split cable assembly 104 includes a first split connector 144 and a second split connector 146; however, the split cable assembly 104 may include more than two split connectors in alternative embodiments. The first split connector 144 is mated to the first electrical component 112. The second split connector 146 is mated with the second electrical component 114. The split cable assembly 104 splits or separates the power from the high speed data transmissions through the split connector assembly 104. For example, in the illustrated embodiment, the cables 140 include a first cable 150, a second cable 152 and a third cable 154; however, any number of cables 140 may be provided in alternative embodiments, including less than three cables or more than three cables. The first and third cables 150, 154 are configured to transmit the high speed data signals between the joint connector 142 and the first split connector 144. The second cable 152 is configured to transmit power between the joint connector 142 and the second split connector 146. The second cable 152 may be routed to a different location than the first and third cables 150, 154. The split cable assembly 104 electrically isolates the signal lines from the power lines.

Optionally, in an exemplary embodiment, the split cable assembly 104 may transmit control signals along a control line in one or more of the cables 140. For example, in an exemplary embodiment, the control line may be routed in the second cable 152 with the power to the second split connector 146. In alternative embodiments, the control line may be routed in its own cable 140. Alternatively, the control line may be routed in the first cable 150 and/or the third cable 154.

Figure 2:
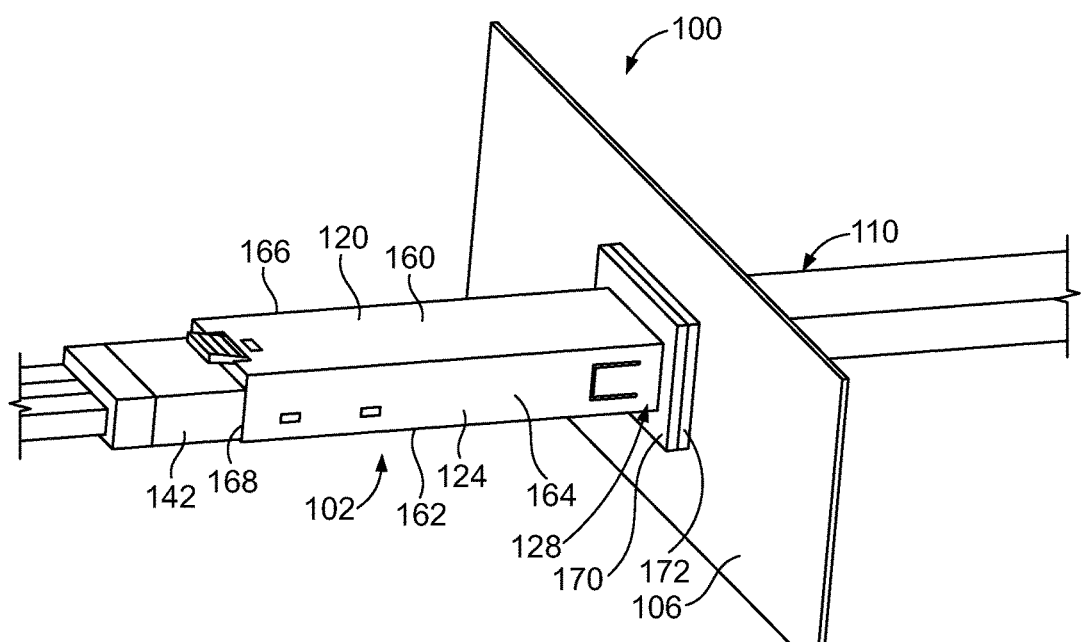
FIG. 2 is a rear perspective view of a portion of the electrical connector system showing a feed-through adapter assembly mounted to a bezel.

FIG. 2 is a rear perspective view of a portion of the electrical connector system 100 showing the feed-through adapter assembly 102 mounted to the bezel 106. The bezel cage 120 includes the walls 124, which are metal shield walls to provide electrical shielding for the feed-through connector 122 (shown in FIGS. 3 and 4) and the pluggable module 110 (shown in FIG. 1). In the illustrated embodiment, the bezel cage 120 has a generally rectangular cross section; however, the bezel cage 120 may have other shapes in alternative embodiments. The walls 124 include an upper wall 160, a lower wall 162 and opposite side walls 164, 166. Other walls 124 may be provided in alternative embodiments. The walls 124 extend between the front end 128 and a rear end 168. The front end 128 is open to receive the pluggable module 110. The feed-through connector 122 may be provided at or near the rear end 168. The rear end 168 may be open to receive the feed-through connector 122 during assembly. The rear end 168 may be open to receive the joint connector 142 to allow the joint connector 142 to be electrically connected to the feed-through connector 122. Alternatively, the feed-through connector 122 may extend from the rear end 168 and the joint connector 142 is mated to the feed-through connector 122 rearward of the rear end 168.

In an exemplary embodiment, the feed-through adapter assembly 102 is mounted to the bezel 106. For example, the bezel cage 120 includes a mounting bracket 170 at or near the front end 128 for mounting the bezel cage 120 to the bezel 106. The mounting bracket 170 may be secured to the bezel 106 using fasteners or other securing mechanisms. In an exemplary embodiment, an EMI gasket 172 is provided at or near the interface between the bezel cage 120 and the bezel 106. The EMI gasket 172 may surround the bezel opening 108 (shown in FIG. 1). The EMI gasket 172 may extend along any of the walls 124, such as along the upper wall 160, the lower walls 162 and/or the side walls 164, 166. Optionally, the EMI gasket 172 may be sandwiched between the mounting bracket 170 and the rear surface of the bezel 106. The EMI gasket 172 may be a compressible foam gasket in various embodiments. Alternatively, the EMI gasket 172 may be a stamped and formed gasket having spring fingers extending between the walls 124 and the bezel 106. The EMI gasket 172 provides EMI shielding between the bezel 106 and the bezel cage 120.

Figure 3:
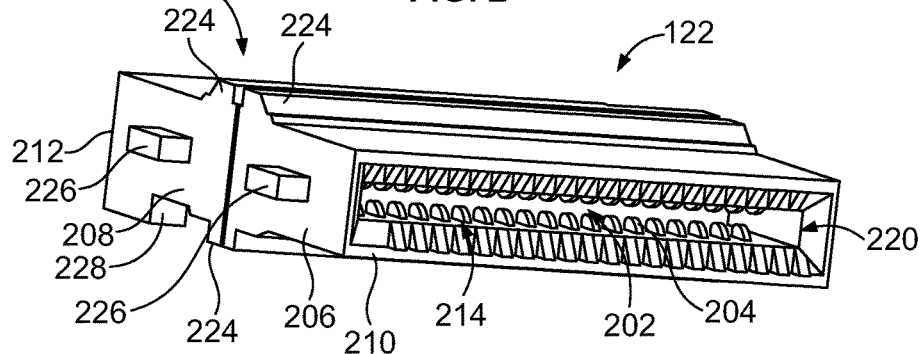
FIG. 3 is a front perspective view of a feed-through connector of the feed-through adapter formed in accordance with an exemplary embodiment.
Figure 4:
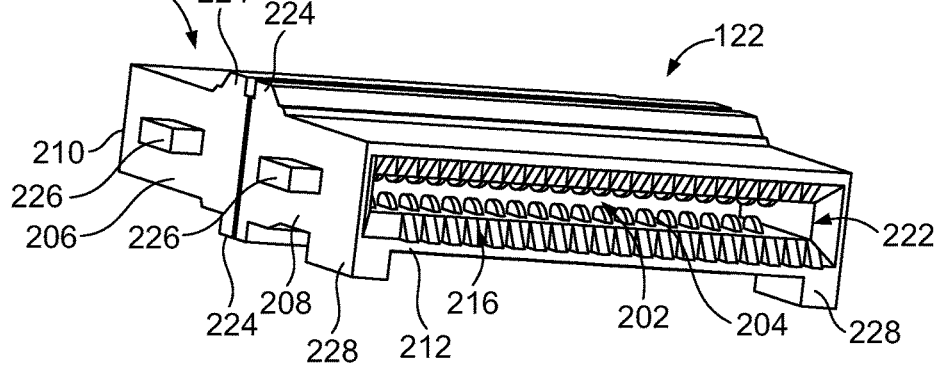
FIG. 4 is a rear perspective view of the feed-through connector.
Figure 5:
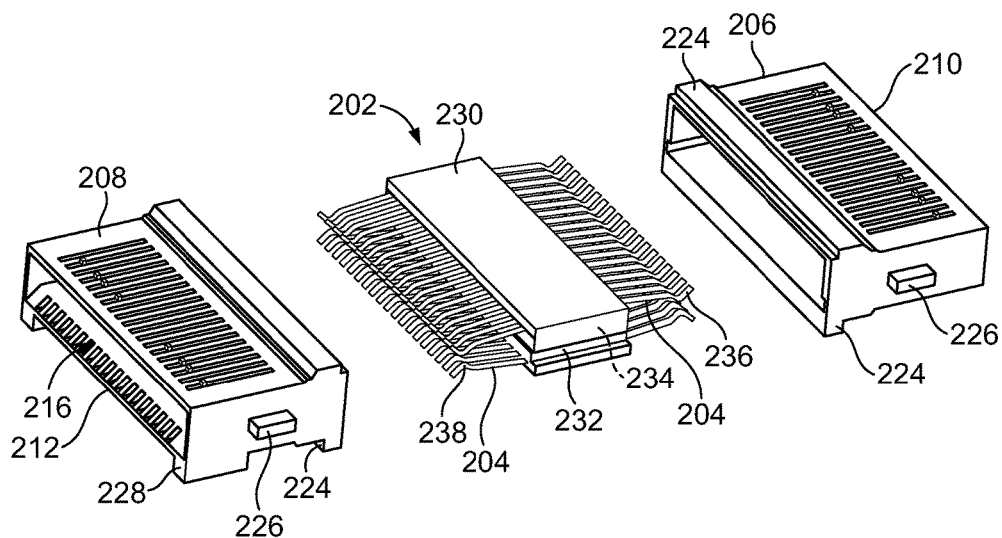
FIG. 5 is an exploded view of the feed-through connector in accordance with an exemplary embodiment.

FIG. 3 is a front perspective view of the feed-through connector 122 formed in accordance with an exemplary embodiment. FIG. 4 is a rear perspective view of the feed-through connector 122. FIG. 5 is an exploded view of the feed-through connector 122 in accordance with an exemplary embodiment.

The feed-through connector 122 has a feed-through connector housing 200 holding a contact assembly 202. The contact assembly 202 has a plurality of feed-through contacts 204. In an exemplary embodiment, the feed-through connector housing 200 is a multi-piece housing including a first housing member 206 and a second housing member 208 coupled together at opposite ends of the feed-through connector 122. For example, the first housing member 206 is provided at a first or front end 210 and the second housing member 208 is provided at a second or rear end 212. In an alternative embodiment, the feed-through connector housing 200 is a single-piece housing. The first housing member 206 includes a first slot 214 and the second housing member 208 includes a second slot 216.

The feed-through connector 122 defines a first board mating interface 220 at the front end 210 and a second board mating interface 222 at the rear end 212. The first board mating interface 220 is defined by the first slot 214 and the feed-through contacts 204 exposed within the first slot 214. The second board mating interface 222 is defined by the second slot 216 and the feed-through contacts 204 exposed at the second slot 216. The first board mating interface 220 is configured to mate with and be electrically connected to the circuit board 132 (shown in FIG. 1) of the pluggable module 110 (shown in FIG. 1). The second board mating interface 222 is configured to mate with and be electrically connected to a circuit board of the joint connector 142 (shown in FIG. 2).

In an exemplary embodiment, the first and second board mating interfaces 220, 222 may be substantially identical. For example, the size and shape of the slots 214, 216 may be substantially identical. The number and positioning of the feed-through contacts 204 at the first and second board mating interfaces 220, 222 may be substantially identical. Optionally, the first and second board mating interfaces 220, 222 may be substantially identical such that the pluggable module 110 may be mated to either of the first or second board mating interfaces 220, 222. Similarly, the joint connector 142 may be mated to either of the first or second board mating interfaces 220, 222. Optionally, the pluggable module 110 and the joint connector 142 may have substantially identical mating interfaces.

The feed-through connector 122 allows the transmissions from the pluggable module 110 to feed-through to the joint connector 142. For example, the high speed data signals, the low speed data signals, the control signals, the power, the ground and the like may pass straight through the feed-through connector 122 from the pluggable module 110 to the joint connector 142.

In an exemplary embodiment, the feed-through connector housing 200 includes locating features 224 for locating the feed-through connector 122 in the bezel cage 120 (shown in FIG. 2). For example, the locating features 224 may be provided at the top and/or the bottom of the feed-through connector housing 200 to position the feed-through connector 122 within the bezel cage 120. The locating features 224 may vertically orient the feed-through connector 122 within the bezel cage 120.

In an exemplary embodiment, the feed-through connector housing 200 includes mounting lugs 226 extending from the sides of the feed-through connector housing 200. The mounting lugs 226 may be used to mount or secure the feed-through connector 122 in the bezel cage 120. For example, the mounting lugs 226 may be received in corresponding slots or openings in the bezel cage 120 to hold the feed-through connector 122 in position relative to the bezel cage 120. For example, the mounting lugs 226 may restrict forward or rearward movement of the feed-through connector 122 in the bezel cage 120. In an exemplary embodiment, both the first housing member 206 and the second housing member 208 include mounting lugs 226. As such, the first housing member 206 may be secured to the bezel cage 120 and the second housing member 208 may be independently secured to the bezel cage 120.

In an exemplary embodiment, the feed-through connector housing 200 includes keying features 228 that are used for keyed mating with the joint connector 142 and/or the pluggable module 110. In the illustrated embodiment, the keying features 228 are tabs extending from the bottom of the second housing member 208. The keying features 228 may block the joint connector 142 from being mated in the incorrect orientation relative to the feed-through connector 122. For example, the keying features 228 block the joint connector 142 from being mated upside-down to the feed-through connector 122. The keying features 228 may interfere with a portion of the joint connector 142 when loaded or mated incorrectly. Other types of keying features 228 may be used in alternative embodiments. Optionally, the keying features 228 may be used to ensure that the feed-through connector 122 is properly mounting within the bezel cage 120. For example, the keying features 228 may allow mating with the joint connector 142 but may block mating with the pluggable module 110. As such, if the feed-through connector 122 were mounting in the bezel case 120 incorrectly (e.g., backwards), the pluggable module 110 would be unable to be mated with the feed-through connector 122.

As shown in FIG. 5, the contact assembly 202 includes a contact holder 230 holding the feed-through contacts 204. In an exemplary embodiment, the contact holder 230 includes a dielectric body 232 overmolded over interior portions 234 of the feed-through contacts 204. The contact holder 230 may be secured to the feed-through contacts 204 by other methods in alternative embodiments. In an exemplary embodiment, the feed-through contacts 204 are continuous between a first mating end 236 and a second mating end 238 with corresponding interior portions 234 therebetween. As such, the feed-through contacts 204 extend straight through the feed-through connector 122 between the first board mating interface 220 and the second board meeting 222. The feed-through contacts 204 may be curved at the mating ends 236, 238 to prevent stubbing when the circuit boards are mated to the feed-through connector 122. The feed-through contacts 204 may be deflectable and spring biased against the circuit boards when the circuit boards are mated thereto. Alternatively, the feed-through contacts 204 may be flat contacts or pads and/or may be held on a substrate and the mating contacts of the pluggable module and/or the cable connector mated thereto may be deflectable. In other various embodiments, the feed through contacts 204 may be flat contacts or pads on one mating end 236 or 238 and the other mating end 236 or 238 may include deflectable beams. Optionally, the feed-through contacts 204 are arranged in an upper row and a lower row configured to engage upper and lower surfaces, respectively, of the circuit boards mated thereto, such as the circuit boards of the pluggable module and/or the cable connector.

During assembly, the contact assembly 202 may be loaded into the first housing member 206 or the second housing member 208 and the other housing member 206, 208 may be coupled thereto. The contact holder 230 may be secured in the housing member 206, 208 by an interference fit. The contact holder 230 may have alignment features for aligning the contact holder 230 within the feed-through connector housing 200. When the feed-through connector 122 is assembled, the housing members 206, 208 may abut against each other. Optionally, the housing member 206 may be secured to the housing member 208. Alternatively, the housing members 206, 208 may be secured relative to each other using the contact holder 230.

Figure 6:
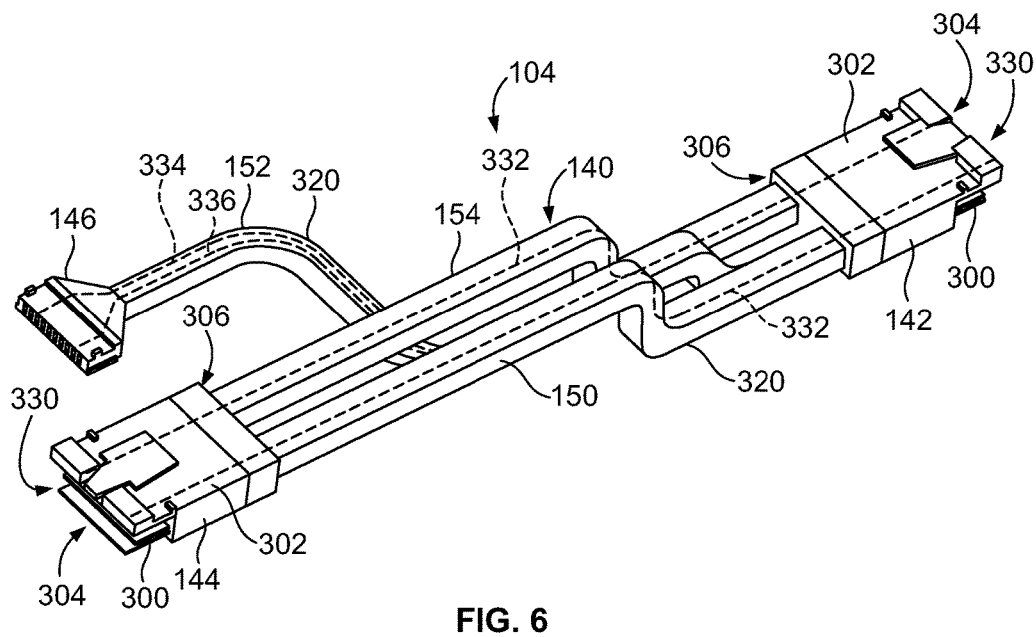
FIG. 6 is a perspective view of a split cable assembly of the electrical connector system formed in accordance with an exemplary embodiment.
Figure 7:
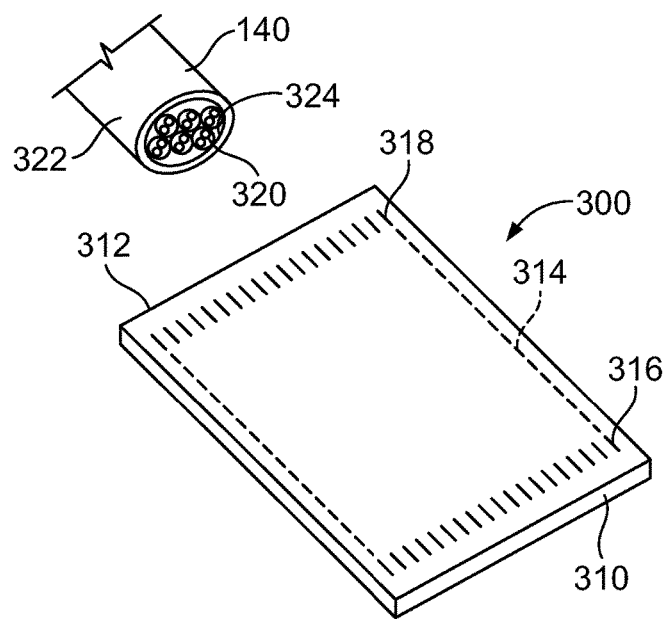
FIG. 7 is a top perspective view of a portion of the split cable assembly showing a circuit board formed in accordance with an exemplary embodiment.

FIG. 6 is a perspective view of the split cable assembly 104 formed in accordance with an exemplary embodiment. FIG. 7 is a top perspective view of a portion of the split cable assembly 104 showing a circuit board 300 formed in accordance with an exemplary embodiment.

The split cable assembly 104 includes the cables 140 extending between the joint connector 142 and the first and second split connectors 144, 146. The joint connector 142 includes a connector housing 302 holding the circuit board 300. The connector housing 302 extends between a mating end 304 and a cable end 306. The cables 140 extend from the cable end 306. The mating end 304 of the connector housing 302 is configured to be mated with the feed-through connector 122 (shown in FIGS. 3-5).

Optionally, at least a portion of the connector housing 302 may be electrically conductive such that the connector housing 302 provides electrical shielding for the circuit board 300. For example, the connector housing 302 may be a plated plastic housing or the connector housing 302 may be die cast or molded from a metal material. The connector housing 302 may be electrically connected to shields or braids of the cables 140. The connector housing 302 may be electrically connected to the bezel cage 120 when the joint connector 142 is mated with the feed-through connector 122.

As shown in FIG. 7, the circuit board 300 has a mating edge 310 at a mating end of the circuit board 300 generally opposite a cable end 312 of the circuit board 300. The mating edge 310 is configured to be loaded into the slot 216 (shown in FIG. 4) of the feed-through connector 122 to electrically connect the circuit board 300 to the feed-through contacts 204 (shown in FIG. 5).

The circuit board 300 includes a plurality of conductors or circuits 314 extending between mating pads 316 at or near the mating edge 310 and cable pads 318 at or near the cable end 312. Individual wires 320 of the cables 140 are configured to be electrically connected to corresponding circuits 314 at the cable pads 318. For example, the wires 320 may be soldered to the cable pads 318.

The wires 320 may be signal wires, power wires, ground wires, control wires or other types of wires depending on the particular application. Optionally, at least some of the wires 320 may be arranged in pairs and may be configured to carry differential signals. Such pairs of wires may be individually shielded within the cable 140. In an exemplary embodiment, multiple wires 320 are provided in each of the cables 140 and are surrounded by a common jacket 322 of the corresponding cable 140. In an exemplary embodiment, the cables 140 may be shielded using an outer cable shield 324 interior of the jacket 322. Optionally, the individual wires 320, or pairs of wires 320, may be separately shielded within the core of the cable 140.

Returning to FIG. 6, each of the cables 150, 152, 154 is terminated to the joint connector 142 and extends from the cable end 306 thereof. The first and third cables 150, 154 extend to the first split connector 144, while the second cable 152 extends to the second split connector 146. In an exemplary embodiment, the first split connector 144 may be similar to the joint connector 142. Optionally, the first split connector 144 may be identical to the joint connector 142. For example, the joint connector 142 and the first split connector 144 may have similar or identical mating interfaces 330 which may be similar or identical to the mating interface of the pluggable module 110 (shown in FIG. 1). Because the first split connector 144 may be similar or identical to the joint connector 142, the first split connector 144 will not be described in detail and like components of the first split connector 144 and the joint connector 142 may be identified with like reference numerals. It is noted that while the joint connector 142 includes all of the cables 140 extending from the cable end 306 thereof, the first split connector 144 has less than all of the cables 140 extending from the cable end 306 thereof. Rather, only the first and third cables 150, 154 extend from the cable end 306 of the first split connector 144.

The wires 320 of the cables 150, 154 are electrically connected to corresponding cable pads 318 of the circuit board 300 of the first split connector 144. Optionally, some of the circuits 314 of the circuit board 300 of the first split connector 144 are not utilized as no wires are terminated thereto. For example, the wires 320 associated with the power lines and/or the control lines are routed in the second cable 152 to the second split connector 146 and are not terminated to the first split connector 144. Alternatively, because the circuit board 300 of the first split connector 144 is terminated to fewer wires 320 than the circuit board 300 of the joint connector 142, the circuit board 300 of the first split connector 144 may include fewer circuits 314 and fewer pads 316, 318 than the circuit board 300 of the joint connector 142.

The wires 320 in the first and third cables 150, 154 define signal lines 332, such as high speed data signal lines, between the joint connector 142 and the first split connector 144. Optionally, the high speed data signal lines may be defined by deferential pairs of the wires 320. In an exemplary embodiment, the wires 320 of the second cable 152 define power lines 334 extending between the joint connector 142 and the second splint connector 146. Power is transmitted from the joint connector 142 to the second split connector 146. Optionally, in an exemplary embodiment, one or more of the wires 320 of the second cables 152 define control lines 336 extending between the joint connector 142 and the second split connector 146. Alternatively, the control lines 336 may additionally or alternatively be provided in the first cable 150 and/or third cable 154, or alternatively may be provided in a separate cable 140. In an exemplary embodiment, the first and third cables 150, 154 each include a plurality of signal wires 320 within the common jacket 322 of such cables 150, 154, whereas the second cable 152 includes a plurality of power wires 320 and/or control wires 320 within the jacket 322 of the second cable 152. As such, the high speed data signal wires are separated from the power wires and/or the control wires to reduce electrical interference therewith. The high speed data signal wires may be electrically shielded separate from the power wires or power lines 334 by the corresponding outer cable shields 324 of the various cables 150, 152, 154.

Figure 8:
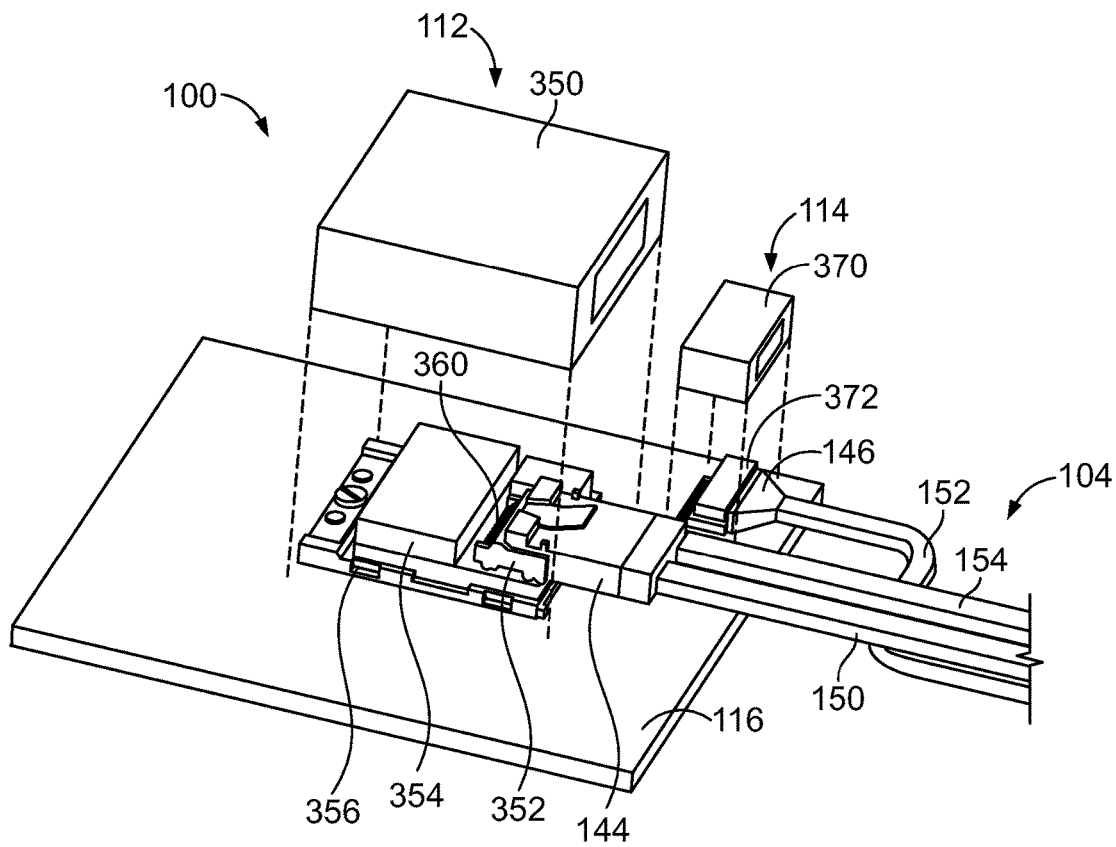
FIG. 8 illustrates a portion of the electrical connector system showing the split cable assembly terminated to electrical components on a host circuit board of the electrical connector system.

FIG. 8 illustrates a portion of the electrical connector system 100 showing the split cable assembly 104 terminated to the electrical components 112, 114 on the host circuit board 116. FIG. 8 illustrates portions of the electrical components 112, 114 in an unassembled state to illustrate internal structures of the electrical components 112, 114 and to illustrate the split cable assembly 104 mated with the electrical components 112, 114. The first split connector 144 is mated with the first electrical component 112 while the second split connector 146 is mated with the second electrical component 114 remote from the first electrical component 112. The first and second electrical components 112, 114 are mounted to different areas of the host circuit board 116.

The first electrical component 112, in the illustrated embodiment, includes a first board cage 350 and a first board connector 352. The first split connector 144 is configured to be mated with the first board connector 352. The first board cage 350 provides electrical shielding for the first board connector 352 and for the interface between the first split connector 144 and the first board connector 352. In an exemplary embodiment, the first electrical component 112 includes a CPU 354 or other processing device. The CPU 354 is electrically connected to the first board connector 352 and receives the high speed data signals from the first split connector 144 via the first board connector 352. In an exemplary embodiment, the first electrical component 112 includes a socket 356 mounted to the host circuit board 116. The socket 356 receives the CPU 354 and/or the first board connector 352.

The first board cage 350 is configured to be mounted to the host circuit board 116 around the socket 356, CPU 354 and first board connector 352. The first board cage 350 includes a plurality of shield walls to provide electrical shielding around the first electrical component 112. The first board cage 350 may include an opening or port to allow the first split connector 144 to be mated with the first board connector 352.

In an exemplary embodiment, the first board connector 352 is a receptacle connector having a plurality of mating contacts 360 defining a mating interface configured to receive the circuit board 300 of the first split connector 144. The first board connector 352 may have a mating interface substantially identical to the second board mating interface 222 of the joint connector 142 (shown in FIG. 4). Optionally, the first board connector 352 may have a mating interface configured to mate with the pluggable module 110. For example, the first board connector 352 may be a standard SFP or QSFP receptacle connector.

The mating contacts 360 of the first board connector 352 may be directly electrically connected to the CPU 354. As such, the high speed data signals are not transmitted through the host circuit board 116, but rather are transmitted directly from the first board connector 352 to the CPU 354. The cables 150, 154 allow routing of the high speed data signal lines from the pluggable module 110 at the bezel 106 (both shown in FIG. 1) to a location in the close vicinity of the CPU 354. As such, the high speed data signal lines do not need to pass through the host circuit board 116. Rather, the high speed data signal lines may be electrically shielded, such as within the twin axial shielding of the cables 150, 154 to a location at or near the CPU 354. The high speed data signals have less loss than if such signals were routed through the host circuit board 116.

The second electrical component 114 includes a second board cage 370 and second board connector 372 configured to be positioned within the second board cage 370. The second board cage 370 provides electrical shielding for the second board connector 372. The second split connector 146 may be mated to the second board connector 372 within the second board cage 370, remote from the first split connector 144. The power lines are thus routed to the host circuit board 116 separate from the high speed data signal lines.

The power may be transmitted to the host circuit board 116 via the second board connector 372. The power may then be routed by the host circuit board 116 to other locations or components. For example, the power may be routed to the first electrical component 112 via the host circuit board 116. The control signals may be routed in a similar manner.

As such, the split cable assembly 104 allows customized signal, power and control routing to different system locations and/or to different circuit boards. The feed-through adapter assembly 102 (shown in FIG. 1) allows connection of an industry standard pluggable module to an industry standard receptacle connector (e.g., the first board connector 352) via the feed-through connector 122 (shown in FIGS. 3-5) and via the split cable assembly 104. For example, the feed-through connector 122 allows straight pass through of the signal, power and/or control lines to the split cable assembly 104 and the split cable assembly 104 separates the lines to allow for the customized routing.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A feed-through adapter assembly comprising:
a bezel cage having a plurality of walls defining a port configured to receive a pluggable module therein through a front end of the cage member, the walls being manufactured from a metal material and providing electrical shielding for the port and the pluggable module, the bezel cage being configured to be mounted to a bezel at an opening in the bezel; and
a feed-through connector received in the bezel cage and positioned at or near a rear end of the cage member, the feed-through connector having a feed-through connector housing holding a contact assembly, the contact assembly having a plurality of feed-through contacts, the feed-through contacts defining a first board mating interface configured to mate with and be electrically connected to a circuit board of the pluggable module, the feed-through contacts defining a second board mating interface configured to mate with and be electrically connected to a circuit board of a cable connector, the first and second board mating interfaces being substantially identical.

2. The feed-through adapter assembly of claim 1, wherein the feed-through connector housing includes a first slot at a first end thereof configured to receive the circuit board of the pluggable module and the feed-through connector housing includes a second slot at a second end thereof configured to receive the circuit board of the cable connector.

3. The feed-through adapter assembly of claim 1, wherein the feed-through contacts are arranged in an upper row and a lower row configured to engage upper and lower surfaces, respectively, of the circuit boards of the pluggable module and the cable connector.

4. The feed-through adapter assembly of claim 1, wherein the feed-through connector housing includes a first housing member and a second housing member coupled together at opposite ends of the feed-through connector, the first housing member including a first slot at the first board mating interface, the second housing member including a second slot at the second board mating interface.

5. The feed through adapter assembly of claim 1, wherein the bezel cage includes an upper wall, a lower wall and opposite side walls between the upper and lower walls, the feed-through connector housing including mounting lugs extending therefrom engaging the side walls to secure the feed-through connector between the upper and lower walls at or near the rear end.

6. The feed-through adapter assembly of claim 1, wherein the feed-through connector includes a first end and a second end, the first end facing the front end of the bezel cage to receive the pluggable module, the second end facing the rear end of the bezel cage to receive the cable connector.

7. The feed-through adapter assembly of claim 1, wherein the bezel cage includes a mounting bracket for mounting the bezel cage to the bezel, the bezel cage comprising an EMI gasket configured to provide EMI shielding between the bezel and the bezel cage.

8. The feed-through adapter assembly of claim 1, wherein the contact assembly includes a contact holder having a dielectric body overmolded over interior portions of the feed-through contacts between the first and second board mating interfaces of the feed-through contacts.

9. An electrical connector system comprising:
a feed-through adapter assembly having a bezel cage and a feed-through connector received in the bezel cage, the bezel cage is configured to be mounted to a bezel at an opening in the bezel, the bezel cage has a plurality of walls providing electrical shielding for the feed-through connector and a pluggable module received in the bezel cage being electrically connected to the feed-through connector, the feed-through connector having a plurality of signal lines and a plurality of power lines electrically connected to the pluggable module; and
a split cable assembly electrically connected to the feed-through adapter assembly, the split cable assembly having a first cable and a second cable, the split cable assembly having a joint connector, a first split connector and a second split connector, the first cable extending between the joint connector and the first split connector, the second cable extending between the joint connector and the second split connector, the joint connector being mated with and electrically connected to the feed-through connector, the first split connector being configured to be mated with a first electrical component mounted to a host circuit board, the second split connector being configured to be mated with a second electrical component being mounted to the host circuit board separate from the first electrical component, the split cable assembly separating signal lines and power lines such that signal lines of the split cable assembly are routed along the first cable to the first split connector and power lines of the split cable assembly are routed along the second cable to the second split connector.

10. The electrical connector system of claim 9, wherein the feed-through connector receives data and power on the signal and power lines, respectively, of the feed-through connector directly from the pluggable module, the split cable assembly splitting the data and power such that the first electrical component receives data from the signal lines of the split cable assembly via a direct connection with the first split connector, and such that the first electrical component receives power from the power lines of the split cable assembly via the host circuit board.

11. The electrical connector system of claim 9, wherein the first cable separately shields the signal lines separate from the power lines.

12. The electrical connector system of claim 9, wherein the first cable includes a plurality of signal wires within a common jacket and the second cable includes a plurality of power wires within a common jacket.

13. The electrical connector system of claim 9, wherein the split cable assembly further comprises a third cable extending between the joint connector and the first split connector, the third cable routing a plurality of signal lines between the joint connector and the first split connector.

14. The electrical connector system of claim 9, wherein the plurality of signal lines are high speed data signal lines, the feed-through connector having at least one low speed data control line, at least one control line of the split cable assembly being electrically connected to the data control line of the feed-through connector and being routed along the second cable to the second split connector.

15. The electrical connector system of claim 9, wherein the first electrical component includes a first board cage and a first board connector electrically connected to the first split connector and being configured to be mounted to the host circuit board, the first board cage surrounding and providing electrical shielding for the first board connector, the second electrical component includes a second board cage and a second board connector electrically connected to the second split connector and being configured to be mounted to the host circuit board, the second board cage surrounding and providing electrical shielding for the second board connector.

16. The electrical connector system of claim 9, wherein the first split connector and the joint connector have substantially identical mating interfaces.

17. The electrical connector system of claim 9, wherein the first electrical connector and the feed-through connector have substantially identical mating interfaces.

18. The electrical connector system of claim 9, wherein the joint connector includes a joint connector circuit board having a mating edge with a plurality of mating pads configured to be mated to the feed-through connector and a cable end with a plurality of cable pads electrically connected to corresponding circuits of the joint connector circuit board, the first split connector includes a split connector circuit board having a mating edge with a plurality of mating pads configured to be electrically connected to the first electrical component and a cable end with a plurality of cable pads electrically connected to corresponding circuits of the split connector circuit board, the first cable including a plurality of wires terminated to cable pads of the joint connector circuit board and corresponding cable pads of the split connector circuit board.

19. An electrical connector system comprising:
a feed-through adapter assembly having a bezel cage and a feed-through connector received in the bezel cage, the bezel cage is configured to be mounted to a bezel at an opening in the bezel, the bezel cage has a plurality of walls defining a port configured to receive a pluggable module therein through a front end of the bezel cage at the bezel, the feed-through connector being positioned at a rear end of the cage member for electrical connection with the pluggable module, the walls being manufactured from a metal material and providing electrical shielding for the feed-through connector and the pluggable module, the feed-through connector having a feed-through connector housing holding a contact assembly, the contact assembly having a plurality of feed-through contacts, the feed-through contacts defining a first board mating interface configured to mate with and be electrically connected to a circuit board of the pluggable module, the feed-through contacts defining a second board mating interface, the feed-through contacts defining a plurality of signal lines and a plurality of power lines through the feed-through connector; and
a split cable assembly electrically connected to the feed-through adapter assembly, the split cable assembly having a first cable and a second cable, the split cable assembly having a joint connector, a first split connector and a second split connector, the first cable extending between the joint connector and the first split connector, the second cable extending between the joint connector and the second split connector, the joint connector being mated with and electrically connected to the feed-through adapter assembly at the second board mating interface, the split cable assembly separating signal and power lines such that signal lines of the split cable assembly are routed along the first cable to the first split connector and power lines of the split cable assembly are routed along the second cable to the second split connector.

20. The electrical connector system of claim 19, wherein the feed-through connector receives data and power on the signal and power lines, respectively, of the feed-through connector directly from the pluggable module, the split cable assembly splitting the data and power such that the first electrical component receives data from the signal lines of the split cable assembly via a direct connection with the first split connector, and such that the first electrical component receives power from the power lines of the split cable assembly via the host circuit board.

\* \* \* \* \*